Dec. 15, 1953     O. J. MORELOCK     2,662,930
HERMETICALLY SEALED ELECTRICAL UNIT
Filed Dec. 13, 1948
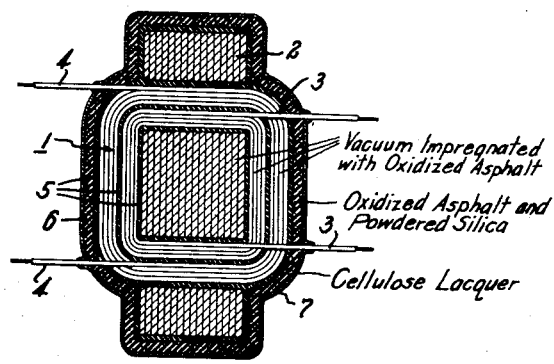
Inventor:
Oliver James Morelock.
By Pierce, Scheffler & Parker,
Attorneys.

Patented Dec. 15, 1953

2,662,930

UNITED STATES PATENT OFFICE 2,662,930

HERMETICALLY SEALED ELECTRICAL UNIT

Oliver James Morelock, Short Hills, N. J., assignor to Weston Electrical Instrument Corporation, Newark, N. J., a corporation of New Jersey Application December 13, 1948, Serial No. 65,033

1 Claim. (Cl. 174—52)

This invention relates to hermetically sealed electrical units, such as inductors, electrical transformers or chokes, and more particularly to uncased electrical units which are not enclosed in metallic housings.

A metal housing or case increases the weight and overall dimensions of an electrical unit and therefore makes it difficult to meet rigid requirements for minimum weight and volume.

Objects of the invention are to provide adequately sealed electrical elements which are not enclosed within metallic housings. Objects are to provide hermetically sealed electrical elements of relatively small size and weight. More specifically, an object is to provide uncased electrical elements such as transformers, chokes, resistance spools and the like, the elements being impregnated with an insulating material and hermetically sealed by other insulating materials which protect the electrical element from shocks and damage during transport, installation and use in an electrical network.

These and other objects and the advantages of the invention will be apparent from the following specification when taken with the accompanying drawing in which the single view is a transverse section through a hermetically sealed electrical element, specifically a transformer on a laminated iron core, embodying the invention.

In the drawing, the reference numeral 1 identifies a transformer winding on a laminated iron core 2. Primary winding leads 3 and secondary winding leads 4 extend from the opposite ends of the respective transformer windings. The transformer per se may be of any desired design since the invention may be applied to various transformers, chokes, inductors, resistors, condensers, rectifiers and other electrical units.

In accordance with the invention, the windings 1 and core 2 are vacuum impregnated for about 24 hours with an oxidized asphalt which may be, for example, a product sold by Esso Standard Oil Company of New Jersey as "160/180 Oxidized Asphalt." This material has a melting point of approximately 250° F., and a flash point of about 450° F. minimum, and the oxidized asphalt bath is maintained at a temperature well above the melting point throughout the impregnation step. An appreciable quantity of the oxidized asphalt remains on the electrical assembly or unit on removal from the bath, and solidifies to form a continuous coating or layer 5.

The impregnated assembly is then dipped into a bath of an oxidized asphalt and a filler such as glass or powdered silica, the oxidized asphalt being preferably the same as that employed for the impregnation step, and being present in the proportions of about 68% by weight to 32% by weight of powdered silica. The melting point of this mixture is about 350° F., and the layer or coating 6 which it provides on the impregnated transformer does not harden to a rigid body but remains somewhat elastic over a wide range of temperatures, i. e. —65° F. to +200° F. This feature is of particular importance with respect to electrical components subjected to relatively low temperatures during use. If the sealing medium hardens or crystallizes at the low temperature, minute cracks or fissures will develop in the protective coating permitting moisture to come into direct contact with the windings.

To afford better handling qualities, and also to afford additional protection against damage from moisture and wide temperature variations, the assembly is then sprayed with or dipped into a modified air-drying lacquer of the cellulose type in an appropriate solvent, for example, alcohol, to form a non-tacky elastic layer or coating 7 on the oxidized asphalt-silica coating 6.

Electrical elements which are sealed as above described show no corrosive effects when immersed in salt water. The impregnation step does not itself afford adequate protection of the electrical units since cracks may appear in the oxidized asphalt layer 5 as a result of the thermal expansion and contraction when subjected to wide extremes in temperature. The oxidized asphalt-silica layer 6 constitutes an intermediate protective layer of greater elasticity for withstanding thermal shocks which tend to break the continuity of the protective coatings. The cellulose compound layer 7 raises the softening or flow-point of the asphalt-silica layer and facilitates handling of the electrical element.

The invention is not restricted to the particular compounds as above described for sealing an electrical unit and it is to be understood that various changes and modifications which may be made in the above-described process for hermetically sealing electrical elements fall within the spirit and scope of the invention as set forth in the following claim.

I claim:

An uncased hermetically sealed electrical unit comprising an electrical element having terminals, and elastic non-hardening insulating material completely enclosing said electrical element except where interrupted to pass said terminals; said electrical element being vacuum impregnated with and coated by an oxidized asphalt, a non-hardening layer of oxidized asphalt and powdered silica on and enclosing said coating of oxidized asphalt, said layer consisting of oxidized asphalt and powered silica in the proportions by weight of the order of 68% oxidized asphalt and 32% powdered silica, and a non-tacky elastic coating of modified air-drying lacquer on and enclosing said non-hardening layer.

OLIVER JAMES MORELOCK.

References Cited in the file of this patent

UNITED STATES PATENTS

| Number | Name | Date |
|---|---|---|
| 482,753 | Reed | Sept. 20, 1892 |
| 1,083,170 | Whipple | Dec. 30, 1913 |
| 1,840,139 | Turner | Jan. 5, 1932 |
| 1,896,040 | Ruben | Jan. 31, 1933 |
| 2,072,557 | Hinsky | Mar. 2, 1937 |
| 2,316,572 | Eaton | Apr. 13, 1943 |
| 2,456,219 | Shaheen | Dec. 14, 1948 |
| 2,459,018 | De Monte et al. | Jan. 11, 1949 |
| 2,466,766 | Hartzell | Apr. 12, 1949 |
| 2,477,172 | Brownlow | July 26, 1949 |